(12) United States Patent
Housman (10) Patent No.: US 9,062,817 B1
(45) Date of Patent: Jun. 23, 2015

(54) FLAT PANEL MONITOR CEILING MOUNTING SYSTEM

(75) Inventor: Charles L. Housman, Newton, MA (US)

(73) Assignee: Computer Sports Systems, Inc., Brighton, MA (US)

(*) Notice: Subject to any disclaimer, the term of this patent is extended or adjusted under 35 U.S.C. 154(b) by 794 days.

(21) Appl. No.: 12/955,712

(22) Filed: Nov. 29, 2010

Related U.S. Application Data (60) Provisional application No. 61/265,081, filed on Nov. 30, 2009, provisional application No. 61/359,136, filed on Jun. 28, 2010.

(51) Int. Cl.
 *B42F 13/00* (2006.01)
 *F16M 13/02* (2006.01)

(52) U.S. Cl.
 CPC ............ *F16M 13/027* (2013.01); *F16M 13/02* (2013.01)

(58) Field of Classification Search
 CPC ..... F16M 13/027; F16M 13/02; F16M 11/10; F16M 11/12

USPC ............. 248/343, 339, 340, 323, 317, 294.1, 248/917
 See application file for complete search history.

(56) References Cited

U.S. PATENT DOCUMENTS

| | | | |
|---|---|---|---|
| 5,435,514 A * | 7/1995 | Kerr, Jr. ........................ | 248/343 |
| D497,537 S * | 10/2004 | O'Keene et al. .............. | D8/355 |
| 6,923,413 B2* | 8/2005 | Dozier ....................... | 248/294.1 |
| D538,632 S * | 3/2007 | Ly Hau et al. ................. | D8/363 |
| 2002/0195531 A1* | 12/2002 | Walker ....................... | 248/228.4 |
| 2009/0251880 A1* | 10/2009 | Anderson .................... | 361/825 |
| 2010/0032538 A1* | 2/2010 | Arnold ......................... | 248/343 |
| 2011/0101191 A1* | 5/2011 | Suciu et al. .................. | 248/343 |

* cited by examiner

*Primary Examiner* — Todd M Epps
(74) *Attorney, Agent, or Firm* — Chapin IP Law, LLC (57) ABSTRACT

A mounting system provides an inexpensive and flexible system to suspend a display component from a ceiling. The system further provides a system to suspend multiple display components. An alternate arrangement provides integrated leveling and height adjustment controls. A method of adjusting a viewing angle of the display component is also disclosed.

13 Claims, 12 Drawing Sheets

FLAT PANEL MONITOR CEILING MOUNTING SYSTEM

CROSS REFERENCE TO RELATED APPLICATIONS

This application claims the benefit of the filing date of earlier filed U.S. Provisional Patent Application having Ser. No. 61/265,081 entitled "FLAT PANEL MONITOR CEILING MOUNTING SYSTEM AND METHOD," filed Nov. 30, 2009, that shares inventorship with the present application. This application claims the benefit of the filing date of earlier filed U.S. Provisional Patent Application having Ser. No. 61/359,136 entitled "FLAT PANEL MONITOR CEILING MOUNTING SYSTEM AND METHOD", filed Jun. 28, 2010, that shares inventorship with the present application. The entire teachings and contents of these patent applications are hereby incorporated by reference herein in their entireties.

BACKGROUND

Figure 1:
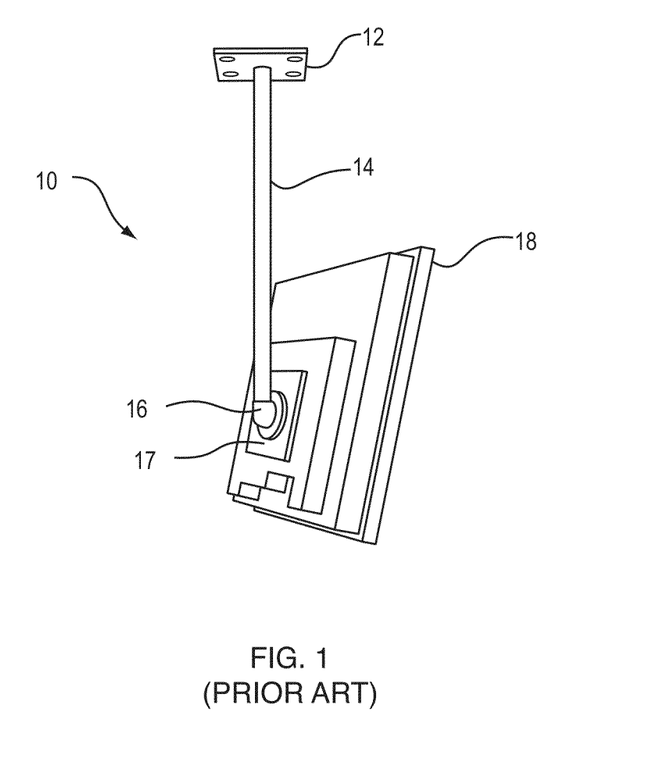
FIG. 1 illustrates a conventional ceiling mount.

It is often necessary to suspend one or more flat screen displays from a ceiling for purposes of showing TV programs, movies, sports, schedules, scoring, or any other type of entertainment or information which can be displayed on such devices. These displays can often be found in restaurants, bars, airports, hotels, sports arenas, bowling centers, or other public venues. A conventional mounting system, ceiling mount 10 is show in FIG. 1. The traditional way of mounting a display component 18 is to use a rigid pole 14 as shown in FIG. 1. One end of the pole 14 is attached to the ceiling using a mounting plate 12, and the other end of the pole 14 is attached to a swivel plate 16 which is fastened to the display component 18 using four fasteners to attach the swivel plate 16 to a Video Electronics Standards Association (VESA) standard mounting interface 17. The spacing of the fastener locations is defined by the Video Electronics Standards Association (VESA) Flat Display Mounting Interface standard (described below).

The Flat Display Mounting Interface is a standard developed by VESA which specifies the spacing of mounting holes on the back of a flat panel display. The spacing of these mounting holes varies from a square of 75 mm×75 mm for very small displays to a rectangular spacing of 800 mm×400 mm for very large displays. Virtually all mounts designed to attach a display to a wall, ceiling, floor or desk stand employ metric fasteners which fasten the mount to the display component using the VESA mounting holes.

SUMMARY OF THE INVENTION

Conventional mounting techniques which typically use a rigid pole can be time consuming to mount and costly because of the requirement to mount a plate to the ceiling. The ceiling must be strong enough to support the display and mount, and a suitably strong fastener must be used to ensure that the mount and display do not fall.

Techniques discussed herein deviate with respect to conventional applications such as those discussed above as well as additional techniques also known in the prior art. In particular, embodiments herein enable the use of pipes, beams, or other such generally available structural components from which the displays can be hung. These structures are often suitable for supporting large weights, since these pipes, beams, or other structures are often either an integral part of the structure of the building, or are already securely attached to the structure of the building. By using these structures, in combination with ropes, cables, wires or chains, one or more display components can be easily suspended.

One exemplary mounting system for mounting one or more components to a ceiling structure includes a plurality of cables having a first ends adapted to be flexibly attached to the ceiling structure and second ends. The mounting system further includes a plurality of fasteners coupled to the second ends the plurality of cables and a horizontal support member coupled to the plurality of fasteners and adjustably coupled to a plurality of vertical brackets. The vertical brackets are adapted to be coupled to a standard mounting interface on the component. Such a mount provides an inexpensive, flexible, adjustable system for easily and quickly mounting components suspended from a ceiling.

Another alternative exemplary mounting system further includes a second horizontal support member interposed between the horizontal support member and the ceiling and adjustably coupled to a plurality of vertical brackets and in contact with at least two of the plurality of cables. This system can also include fasteners which are secure adjustable fasteners. Such a system allows for the adjustment of cable length to level the component and also adjustment of the height of the display component.

A technique for suspending a component from a ceiling structure includes attaching first ends of a plurality of cables to the ceiling structure, attaching a plurality of vertical brackets to a standard mounting interface of the component, attaching a horizontal rod to the plurality of vertical brackets and attaching second ends of the plurality cables to the horizontal rod. The technique further includes adjusting the tilt of the component by moving the horizontal rod to different positions on the vertical brackets. Such a technique provides adjustments to the height and tilt of the component.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Embodiments according to this invention allow for leveraging readily available support structures with wire, cable, rope or chains or any other strong flexible material to provide a mounting system to suspend one or more display components from a ceiling.

As used herein the term "component," "display component" or "display" refers to any monitor, display monitor, including but not limited to, flat screen displays, LCD displays, plasma displays and other display technologies embodied in a monitor. Embodiments of the invention can be used with any display suitable for ceiling mounting.

Figure 2A:
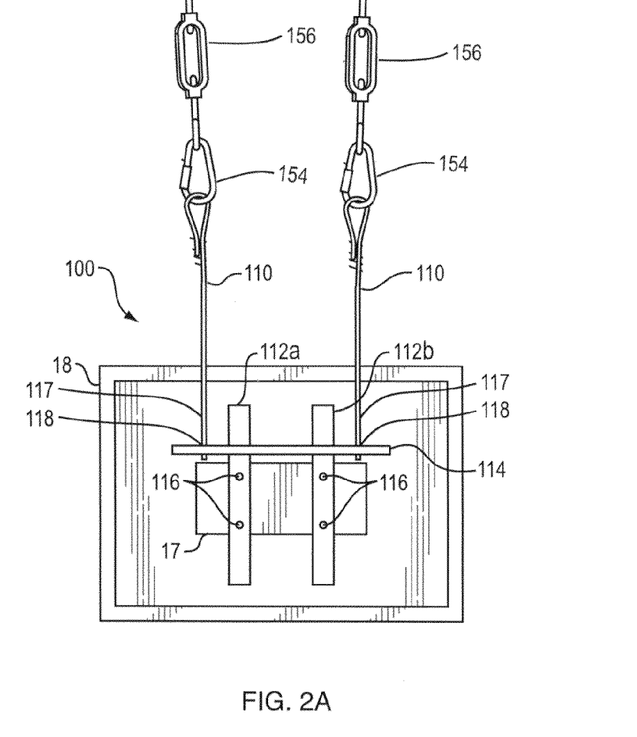
FIG. 2A is a schematic diagram of a ceiling mounting system for a component in accordance with one example embodiment disclosed herein.

Now referring to FIG. 2A, a mounting system 100 for suspending a single component display includes a plurality of cables 110 each having a first end adapted to be flexibly attached to the ceiling structure (not shown) and second ends 117, a plurality of fasteners 118 coupled to corresponding ones of second ends 117 of the plurality of cables 110, and a horizontal support member 114 coupled to the plurality of fasteners 118. The horizontal support member 114 is adjustably coupled to a plurality of vertical brackets 112a-112b (collectively referred to as vertical brackets 112). The vertical brackets 112 are adapted to be coupled to the standard mounting interface 17 on the component 18 with fasteners 116.

In one embodiment, the horizontal support member 114 is steel supporting rod or steel pipe. It is understood that the rod can have various cross-sectional shapes, including but not limited to, circular, square, rectangular, elliptical, etc. In this embodiment, the vertical brackets 112 are metal brackets shaped in a 'U' (typically called a U channel). There are spaced apart openings (also referred to as holes or slots) on the bottom of the U channel for fastening the vertical bracket 112 to the display component 18. The openings are spaced 10 or 20 mm apart so as to align with standard VESA hole spacing of 100, 200 or 400 mm. Vertical brackets 112 include one or more spaced apart openings on the side through which the horizontal support member 114, here, a steel rod is inserted. Choice of which opening in the vertical brackets 112 to use will affect a viewing tilt angle (as described below in conjunction with FIGS. 4-7). The length of each vertical bracket 112 can vary from a minimum length needed to span the mounting holes on the display, to a length equal to or exceeding the height of the display. A length of each vertical bracket 112 in between these two extremes will allow for positioning of the horizontal support member 114 relative to the back of the display 18, which will also change the tilt angle of the display 18.

This mounting system 100 can be used with pre-existing cables with turnbuckles or other length adjusting devices. System 100 is generally used when there is an existing adjustable fastener 156 (here a turnbuckle) coupled to a secure fastener 154 (here a quick link) already fastened to a ceiling structure. In operation the existing adjustable fastener is used to adjust the height and levelness of the component 18.

Figure 2B:
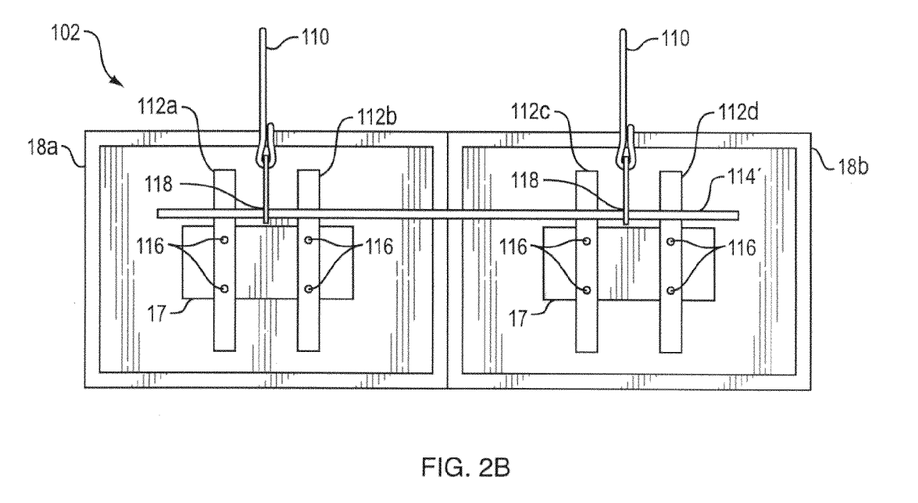
FIG. 2B is a schematic diagram of a ceiling mounting system for dual components in accordance with one example embodiment disclosed herein.

Now referring to FIG. 2B, a mounting system 102 for suspending a dual component displays 18a and 18b includes an extended horizontal support member 114'. System 102 is similar to system 100 of FIG. 2A and is used where it is desired to suspend more than one display component from the ceiling. Each additional display includes a pair of vertical brackets 112a-112b, 112c-112d and the length of the horizontal support member 114' is increased to attach to the vertical brackets 112. Multiple displays can be hung from the ceiling by inserting the horizontal support member 114' through one or more pairs of vertical brackets 112. Each pair of vertical brackets 112 is attached to one display 18. Only one pair of cables 110 or chains 110 is required to support multiple displays 18, but additional cables 110 or chains 110 (spaced along the length of the horizontal support member 114') and additional vertical brackets 112 can be used for increased strength and stability of the system. In one embodiment, the horizontal support member 114' is attached to the suspending cables 110 or chains 110 using a suitable secure fastener such as a quick link (also referred to as a safety chain quick link) and metal carabineer or a connecting link such as an S hook.

Figure 3A:
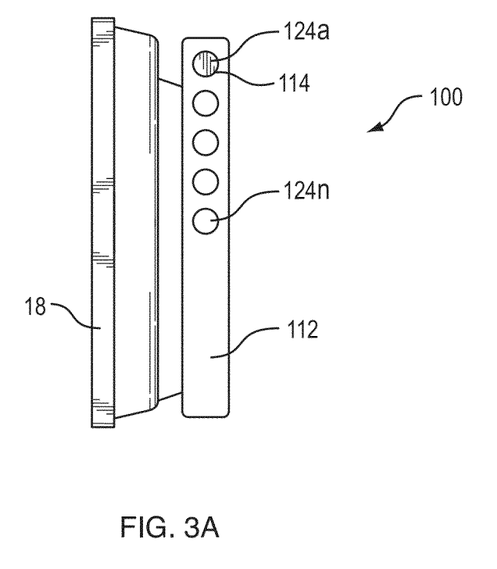
FIG. 3A is a side view of an embodiment of the system of FIG. 2A.
Figure 3B:
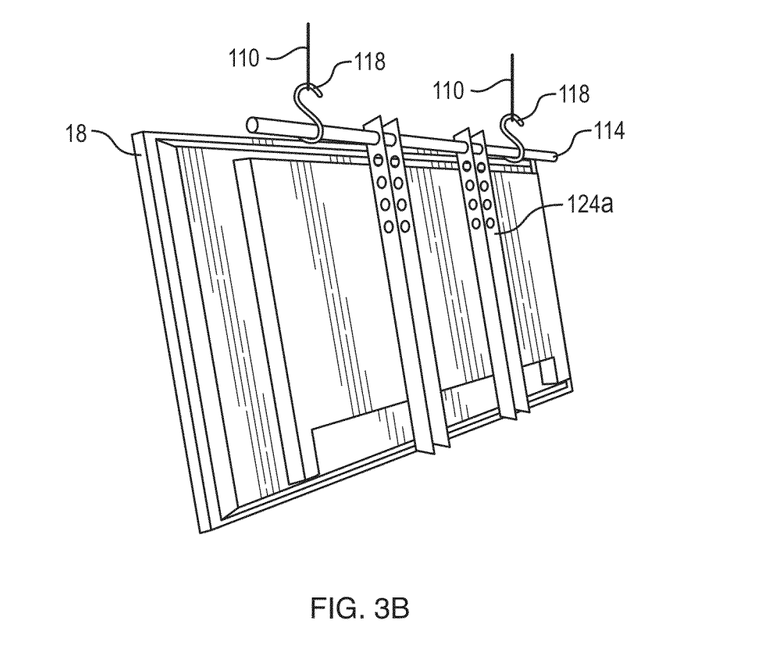
FIG. 3B is a perspective view of an embodiment of the system of FIG. 2A.

FIG. 3A illustrates a side view of mounting system 100 and one of the vertical brackets 112 including spaced apart openings 124a-124n. Horizontal support member 114, here a rod, has been inserted in one of the spaced apart openings 124a. FIG. 3B illustrates the display component 18 suspended from the ceiling using mounting system 100.

Figure 4A:
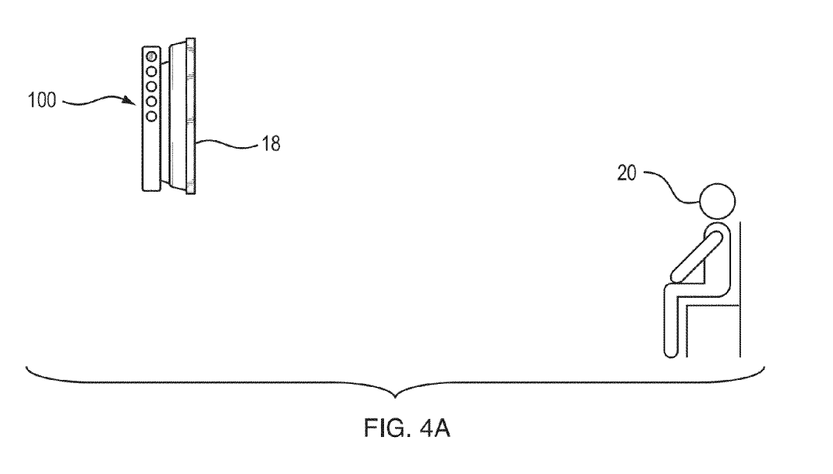
FIG. 4A is a diagram of the mounting system of FIG. 2A with the component in a vertical position.
Figure 4B:
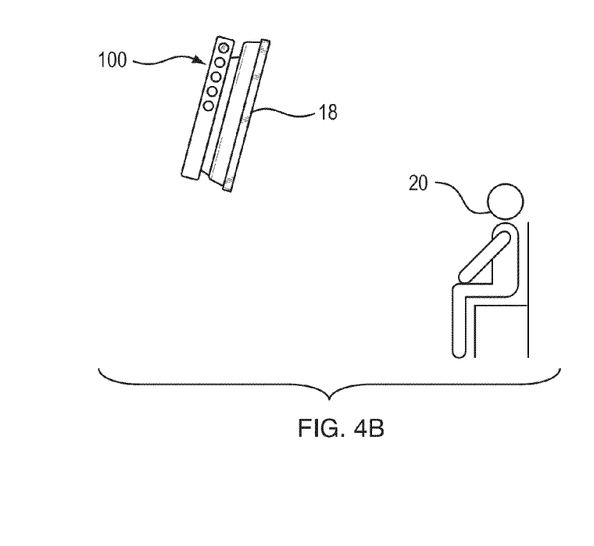
FIG. 4B is a diagram of the mounting system of FIG. 2A with the component in a tilted position.

Now referring to FIG. 4A, the mounting system 100 and the display component 18 are positioned approximately vertically for viewing from a distance by a viewer 20. FIG. 4B is a diagram of the mounting system of FIG. 2A with the display component 18 in a tilted position for viewing by the viewer 20 who is closer to the display component 18 than the viewer 20 in FIG. 4A. In different applications, it is sometimes necessary to adjust the downward tilt of the display 18. In those applications where the viewer 20 is relatively further away from the display as in FIG. 4A, the display 18 can be mounted approximately vertically (no tilt), but when the viewer 20 is close to the display 18 as in FIG. 4B, the display 18 should be tilted downward to give an optimal presentation to the viewer 20.

During installation, the ceiling mounting system 100 provides at least three ways to change the tilt of the display 18. A first method of adjusting the tilt is to insert the horizontal support rod through a lower set of spaced apart openings 124c in the vertical brackets 112 (see FIGS. 5A and 5B). The display 18 will tend to tilt downward as more of the weight of the display 18 is shifted to above the horizontal support member 114. Thus, a tilt angle 128 with respect to a vertical axis from the ceiling is increased by putting the horizontal support member 114 through a lower set of spaced apart openings 124c on the vertical brackets 112.

Figure 5A:
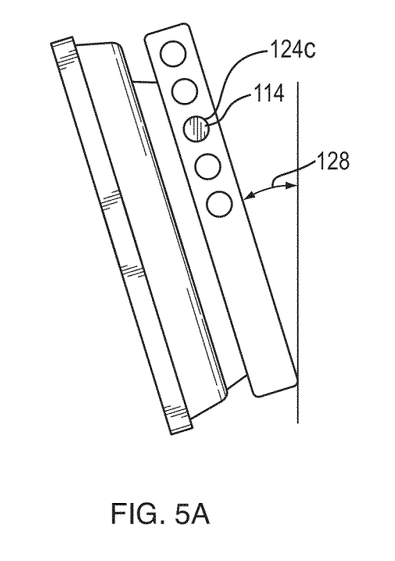
FIG. 5A is a side view of an alternate arrangement of the embodiment of the system of FIG. 2A to increase the tilt of the component.
Figure 5B:
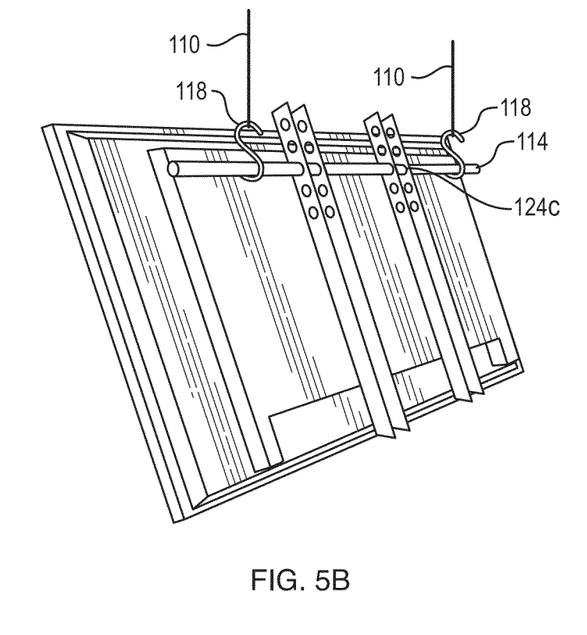
FIG. 5B is a perspective view of an alternate arrangement of the embodiment of the system of FIG. 2A to increase the tilt of the component.
Figure 6A:
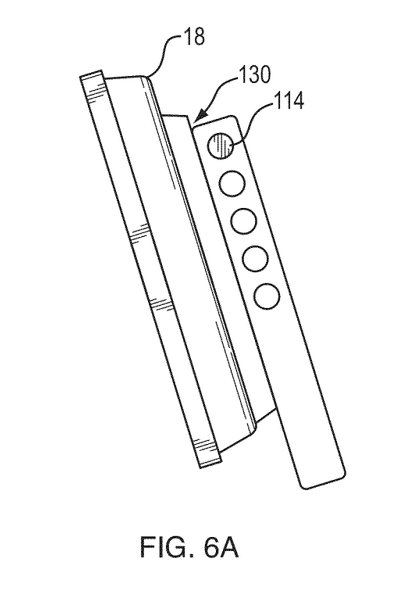
FIG. 6A is a side view of another alternate arrangement of the embodiment of the system of FIG. 2A to increase the tilt of the component.
Figure 6B:
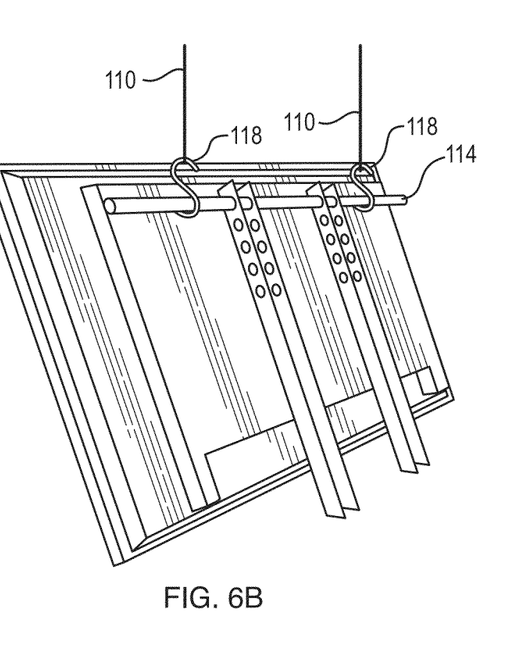
FIG. 6B is a perspective view of another alternate arrangement of the embodiment of the system of FIG. 2A to increase the tilt of the component.

Now referring to FIGS. 6A and 6B, a second method of adjusting tilt involves the position where the vertical brackets 112 are mounted on the back of the display 18. By moving the vertical brackets 112 to a lower position 130 relative to the top of the display 18, the horizontal support member 114 is also moved lower, and the display 18 will tend to tilt downward as more of the weight of the display 18 is shifted to above the horizontal support member 114. This method achieves a similar tilt as described in the first method The first method (as shown in FIGS. 5A and 5B) has the advantage of requiring fastening the vertical bracket once, and then using different sets of spaced apart openings 124 to obtain various tilt angles 128. The second method allows for finer adjustment of the tilt angle 128.

Figure 7A:
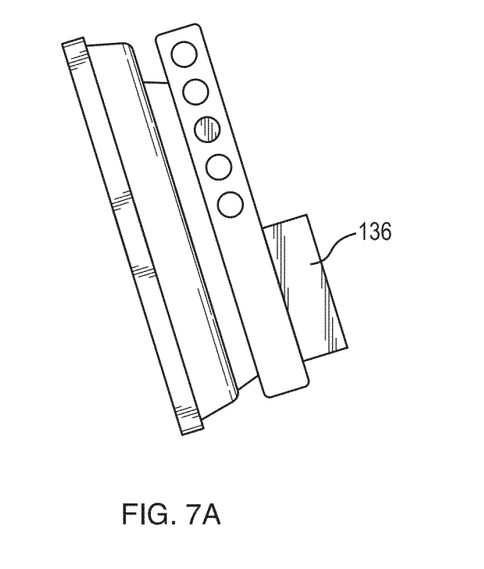
FIG. 7A is a side view of an alternate arrangement of the embodiment of the system of FIG. 2A using a counterweight to decrease the tilt of the component.
Figure 7B:
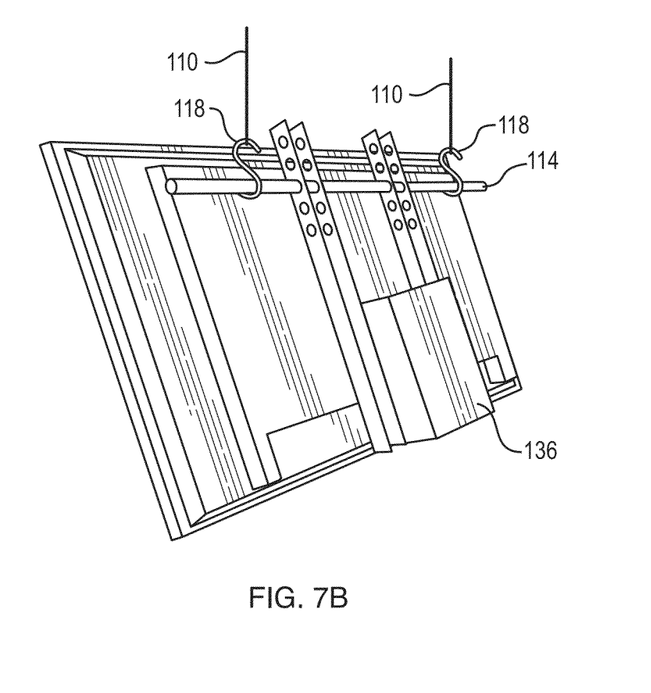
FIG. 7B is a perspective view of an alternate arrangement of the embodiment of the system of FIG. 2A using a counterweight to decrease the tilt of the component.

A third method of adjusting the tilt is to place a counterweight 136 on the mounting system 100 on the back of the display 18 near the bottom as shown in FIGS. 7A and 7B. This counterweight 136 can be placed on a shelf which is attached to the two vertical brackets 112. The tilt angle of the display is adjusted by increasing or decreasing the weight of the counterweight 136 which changes the amount of weight above and below the horizontal support member 114. As the weight is increased, the display 18 becomes more vertical.

Figure 8:
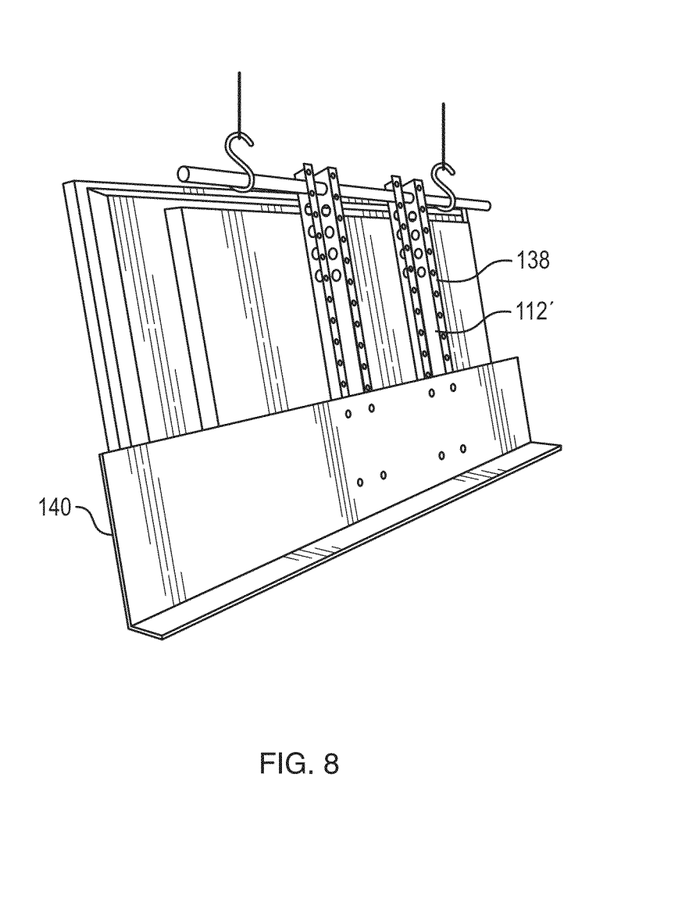
FIG. 8 is a perspective view of an arrangement of the embodiment of the system of FIG. 2A including a shelf.

Now referring to FIG. 8, an additional feature of mounting system 100 is a shelf 140 (also referred to as a panel). Here, vertical brackets 112' (similar to vertical brackets 112 described above) include additional flanges 138. Shelf 140 is attached to the flanges 138 on the vertical brackets 112'. Each flange 138 includes holes attached to each side of the vertical brackets 112'. The flange 138 with holes serves as a base to which the shelf 140 can be attached. The shelf 140 serves as a base to which other equipment can be attached (e.g., a cable or satellite TV box) (not shown) or a larger panel 140 can be attached to the flange 138 to hold larger equipment. The flange 138 and shelf 140 serve to improve the versatility of the mounting system. Attachment of the shelf 140 to the vertical brackets 112' on the multiple display mounting system 102 also serves to stabilize and align the mounting system 102 when multiple displays 18 are suspended from a single horizontal support member 114'.

Figure 9:
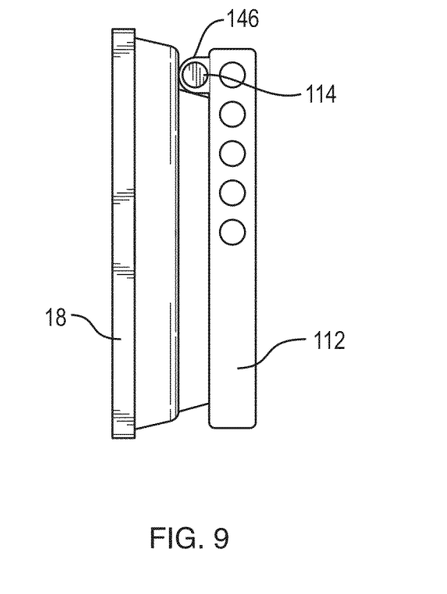
FIG. 9 is a side view of another alternate arrangement of the embodiment of the system of FIG. 2A for mounting the horizontal support member.

In another embodiment, as shown in FIG. 9, a U-bolt 146 is used to fasten the horizontal support member 114 to each vertical bracket 112 when a near vertical orientation of the display 18 is desired. This variation involves attaching the U-bolt 146 to the backside of the vertical bracket 112. The U-bolt 146 allows the horizontal support member 114, here a supporting rod, to be inserted on the backside of the vertical bracket 112. Since this arrangement moves the horizontal support member 114 towards the front of the display 18, the display 18 will tend to tilt less and remain more vertical. The counterweight 136 as described above can be used in conjunction with this variation when true vertical orientation of the display 18 is desired.

Figure 10:
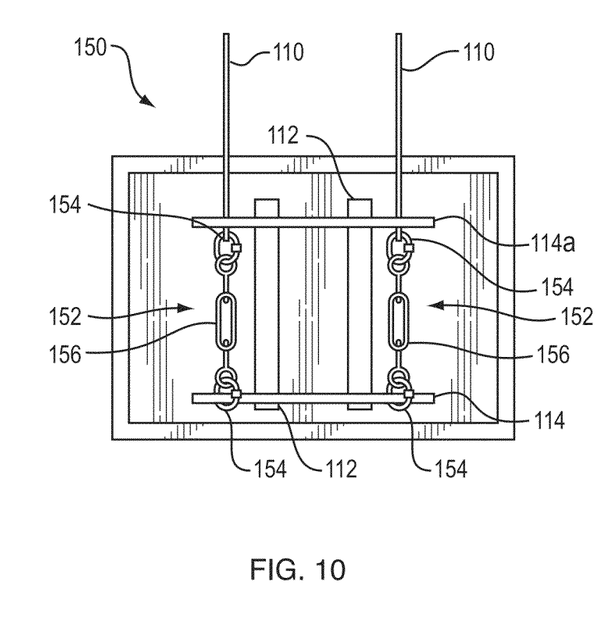
FIG. 10 is a schematic diagram of a ceiling mounting system for a component using two horizontal support members in accordance with one example embodiment disclosed herein.
Figure 11:
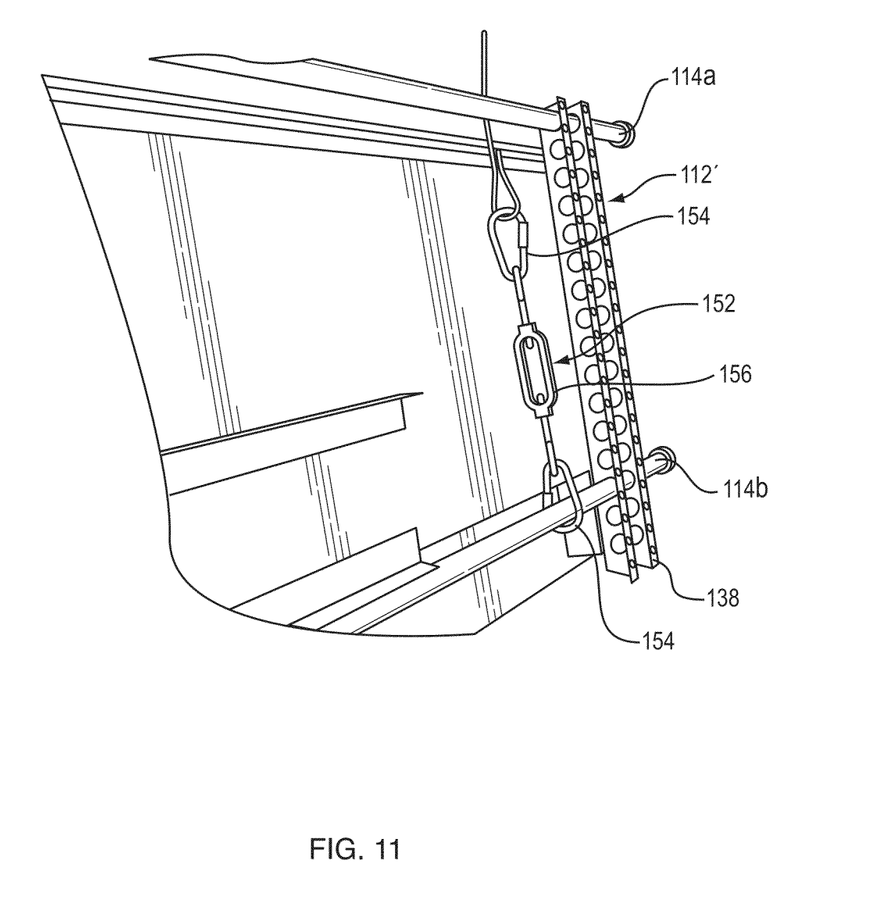
FIG. 11 is a partial perspective view of an embodiment of the system of FIG. 10 showing the use of secure adjustable fasteners.
Figure 12:
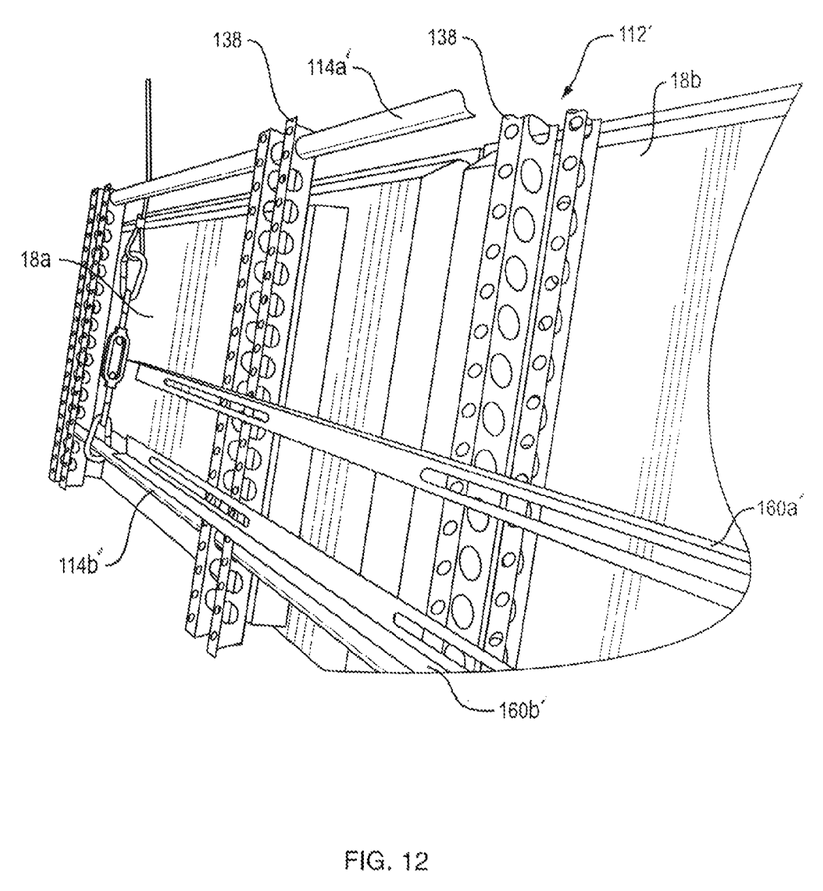
FIG. 12 is a partial perspective view of an embodiment of the system of FIG. 10 used for mounting dual components.

FIGS. 10, 11 and 12, show an alternate embodiment in which a mounting system 150 includes a second horizontal support member 114a. The second horizontal support member 114a is interposed between the horizontal support member 114b and the ceiling and adjustably coupled to the plurality of vertical brackets 112' and in contact with or adjacent to at least two of the plurality of cables 110. Here, a plurality of secure adjustable fasteners 152 is used to couple the horizontal support member 114b and the cables 110. In one embodiment, the secure adjustable fastener 152 includes a turnbuckle 156 with a quick link 154 connector on both ends.

Mounting system 150 is used when the suspending cables 110 or chains are of uneven length, or when it is desired to move the monitors 18 closer to the ceiling without altering the existing cables or chains. This embodiment uses two horizontal support members 114b and 114a instead of a single horizontal support member 114. The cables 110 are threaded between the second horizontal support member 114a, here the upper horizontal support member, and the monitor 18 or monitors 18. In some configurations the cables 110 are in contact with the second horizontal support member 114a. The placement of the second horizontal support member 114a determines the tile angle of the monitor 18 (or monitors in a multiple monitor arrangement). The cables 110 are then attached to the lower horizontal support member 114b using turnbuckles 156 with quick links 154 or other adjustable or fixed devices to securely couple the cables or chains to the lower horizontal support member 114b. Adjusting one or both of the turnbuckles 156, as shown in FIG. 11 can compensate for uneven lengths of the two cables or chains. Also, by putting the lower horizontal support member 114b through mounting holes in the vertical brackets 112' which are lower to the bottom of the monitor, more of the cable or chain is placed behind the monitors, which has the effect of raising the monitors 18 closer to the ceiling. Optional brackets 160a and 160b can be attached to flanges 138 on the vertical brackets 112' to provide additional support and stability when multiple display components 18 are suspended from the ceiling. The brackets 160 can act as shelves or stability bars, and also serve to adjust and set the horizontal spacing (from about zero to any desired distance) between multiple display components 18.

It will be appreciated that such a system can be used to mount multiple monitors 18a and 18b using an elongated lower horizontal support member 114b' and an elongated second horizontal support member 114a' as shown in FIG. 12. It will also be appreciated that such a system can include multiple adjustable mounting brackets 160a' and 160b' to provide further stabilization and to provide a location for mounting additional components and electronic interface boards.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A flat panel monitor ceiling mounting system comprising:
    a plurality of cables each having a first end adapted to be flexibly attached to a ceiling structure and a second end;
    a plurality of secure adjustable fasteners each coupled to the second end of each of the plurality of cables;
    a first horizontal support member coupled to the plurality of secure adjustable fasteners and adjustably coupled to a plurality of vertical brackets;
    a second horizontal support member interposed between the first horizontal support member and the ceiling and adjustably coupled to the plurality of vertical brackets and in contact with two of the plurality of cables;

wherein the plurality of vertical brackets are adapted to be coupled to a standard Video Electronics Standards Association (VESA) mounting interface on a flat panel monitor;

wherein the plurality of vertical brackets each include a series of spaced apart openings adapted to receive the first horizontal support member and the second horizontal support member providing adjustment of a tilt angle of the flat panel monitor;

wherein each of the plurality of secure adjustable fasteners is disposed between ceiling structure and the first horizontal support; and wherein each of the plurality of secure adjustable fasteners comprises:

a turnbuckle; and at least one quick link coupled to the turnbuckle.

2. The mounting system of claim 1, wherein the first horizontal support member and the second horizontal member are elongated and coupled to a second plurality of vertical brackets which are coupled to a standard mounting interface on a second flat panel monitor.

3. The mounting system of claim 1, wherein the first horizontal support member and the second horizontal member are rods adapted to fit through one of the series of spaced apart openings in each of the plurality of vertical brackets.

4. The mounting system of claim 1, wherein the plurality of vertical brackets each include the pair of spaced apart openings adapted to receive a U-bolt which couples the first horizontal support member to the corresponding vertical bracket.

5. The mounting system of claim 1, wherein the plurality of vertical brackets include a flange having a series of spaced apart openings and the mounting system further comprises a shelf coupled to flange of at least one of the plurality of vertical brackets.

6. The mounting system of claim 1, wherein the plurality of cables comprise chains.

7. The mounting system of claim 1, wherein the plurality of vertical brackets comprise U-channel brackets.

8. The mounting system of claim 1, wherein each first end is flexibly attached to the ceiling structure by using a secure fastener coupled to an installed adjustable fastener attached to the ceiling structure.

9. A method of suspending a flat panel monitor from a ceiling structure, comprising:

attaching first ends of a plurality of cables to the ceiling structure;

attaching a plurality of vertical brackets to a Video Electronics Standards Association (VESA) standard mounting interface of the flat panel monitor;

attaching a first horizontal rod to the plurality of vertical brackets by inserting the first horizontal rod through one of a series of spaced apart openings in each of the plurality of vertical brackets;

attaching a second horizontal rod adjustably coupled to the plurality of vertical brackets and interposed between the first horizontal rod and the ceiling structure; and wherein the plurality of cables are disposed between the second horizontal rod and the flat panel monitor; and attaching each second ends of the plurality cables to the first horizontal rod using a secure fastener comprising:

a turnbuckle; and at least one quick link coupled to the turnbuckle.

10. The method of claim 9 further comprising adjusting a tilt angle of the flat panel monitor by moving the first horizontal rod to different positions on the plurality of vertical brackets.

11. The method of claim 9 further comprising adjusting tilt of the flat panel monitor by adjusting a position of the plurality of vertical brackets to the standard mounting interface of the flat panel monitor.

12. The method of claim 9 further comprising decreasing a tilt angle of the flat panel monitor by adding a counterweight coupled to the plurality of vertical brackets.

13. The method of claim 9 further comprising adjusting height and levelness of the flat panel monitor by adjusting at least one of the turnbuckles coupled between the plurality of cables and the first horizontal rod.

* * * * *